United States Patent [19]

Nagatani et al.

[11] Patent Number: 5,648,688

[45] Date of Patent: Jul. 15, 1997

[54] AUTOMOBILE MULTIPLEX COMMUNICATION WIRING STRUCTURE INCLUDING SHIELD

[75] Inventors: Yuji Nagatani; Hiroshi Hashimoto, both of Wako, Japan

[73] Assignee: Honda Giken Kogyo Kabushiki Kaisha, Tokyo, Japan

[21] Appl. No.: 582,418

[22] Filed: Jan. 3, 1996

[30] Foreign Application Priority Data

Apr. 27, 1995 [JP] Japan .................................. 7-103501

[51] Int. Cl.⁶ .................................................. H04J 15/00
[52] U.S. Cl. ...................... 307/10.1; 370/546; 307/91
[58] Field of Search ............................. 307/9.1–10.6, 307/89, 91; 370/85.1, 85.9, 85.11, 6; 364/424.01–424.06; 327/310; 340/825.54, 825.52, 825.3, 825.26; 324/627; 174/35 R, 34, 35 MS, 75 C; 333/12

[56] References Cited

U.S. PATENT DOCUMENTS

| | | | |
|---|---|---|---|
| 3,697,896 | 10/1972 | Sarkozi et al. | 333/12 |
| 3,943,489 | 3/1976 | Brewster et al. | 340/825.26 |
| 4,398,172 | 8/1983 | Carroll et al. | 340/825.54 |
| 5,095,891 | 3/1992 | Reitter | 174/75 C |
| 5,218,248 | 6/1993 | Nagao | 327/310 |
| 5,414,345 | 5/1995 | Rogers | 324/627 |

FOREIGN PATENT DOCUMENTS 0491179  6/1992  Germany.

OTHER PUBLICATIONS

Patent Abstracts of Japan, vol. 009, No. 215 (M–409), JP–A–60 074902 (Kinki Shiyariyou KK; Others: 01), 27 Apr. 1985.

*Primary Examiner*—Richard T. Elms
*Attorney, Agent, or Firm*—Nikaido Marmelstein Murray & Oram LLP

[57] ABSTRACT

An automobile multiplex communication system has a plurality of control units mounted on an automobile body and having respective circuits which are connected to communication signal lines through respective connectors for multiplex communications between the control units. Shield wires which cover the communication signal lines between the control units are electrically separate from the connectors and connected to ground. The shield wires have respective ends grounded to a conductor of the automobile body outside of the control units or grounded to conductor housings of the control units.

1 Claim, 3 Drawing Sheets

AUTOMOBILE MULTIPLEX COMMUNICATION WIRING STRUCTURE INCLUDING SHIELD

BACKGROUND OF THE INVENTION

1. Field of the Invention

The present invention relates to a wiring structure for an automobile multiplex communication system.

2. Description of the Related Art

In recent years, there have been developed automobile multiplex communication systems in which a plurality of control units each comprising a microcomputer or the like are installed on an automobile body for multiplex communications between those control units.

As shown in FIG. 3 of the accompanying drawings, a conventional automobile multiplex communication system includes a plurality of control units (ECUs) "a" interconnected by communication signal lines "b" in the form of twisted pairs which are connected to circuits "d" including microcomputers in the ECUs "a" through connectors "c" such as multiterminal connectors or the like.

Since automobiles are subject to external noise, the communication signal lines "b" are covered with shield wires "e" between the ECUs "a" for preventing the communication signal lines "b" from being affected by such external noise.

The shield wires "e" are required to be grounded to a location which is not susceptible to external noise, e.g., a conductor of the automobile body. Heretofore, the shield wires "e" have been grounded as follows:

As with the communication signal lines "b", the ends of the shield wires "e" which cover the communication signal lines "b" between the ECUs "a" are introduced into the ECUs "a" through the connectors "c". In the ECU "a" in which plural communication signal lines "b" and shield wires "e" are introduced, i.e., in the central ECU "a" shown in FIG. 3, the communication signal lines "b" are connected to each other, and the shield wires "e" are connected to each other. With respect to one of the ECUs "a", i.e., with respect to the central ECU "a" shown in FIG. 3, the shield wires "e" introduced through the connector "c" into the ECU "a" are led out of the ECU "a" and grounded to a conductor "f" of the automobile body.

The above wiring structure for the automobile multiplex communication system suffers the following drawbacks:

The portions of the communication signal lines "b" which are covered by the shield wires "e" between the ECUs "a" are protected against entry of external noise into the communication signal lines "b". However, since the connector terminals of the connectors "c" which are connected to the communication signal lines "b" tend to be not fully shielded, external noise applied to the shield wires "e" is likely to be picked up by the shield wires "e" serving as an antenna and applied through the connector terminals to the communication signal lines "b". Consequently, it has been impossible to sufficiently protect the automobile multiplex communication system against entry of external noise into the communication signal lines "b".

SUMMARY OF THE INVENTION

It is therefore an object of the present invention to provide a wiring structure for an automobile multiplex communication system, which sufficiently shields communication signal lines that interconnect a plurality of control units through connectors against external noise, for thereby making automobile multiplex communication system highly resistant to external noise.

To achieve the above object, there is provided in accordance with the present invention a wiring structure for an automobile multiplex communication system, comprising a plurality of control units mounted on an automobile body, the control units having respective circuits and respective connectors connected thereto, communication signal lines connected to the circuits through the respective connectors for multiplex communications between the control units, and shield wires covering the communication signal lines between the control units, the shield wires being electrically separate from the connectors and connected to ground.

Since the shield wires are grounded in electric isolation from the connectors by which the communication signal lines are connected to the circuits of the control units, external noise applied to the shield wires is prevented from being introduced into the communication signal lines through the connectors.

Because external noise applied to the shield wires is prevented from being introduced into the communication signal lines through the connectors, the communication signal lines are sufficiently shielded against external noise, and hence the automobile multiplex communication system is highly resistant to external noise.

The shield wires may have respective ends grounded to a conductor of the automobile body outside of the control units. Alternatively, the control units may have respective housings of a conductor material, and the shield wires may have respective ends grounded to the housings.

Inasmuch as the shield wires are grounded closely to the connectors of the control units, external noise is prevented from being radiated through the shield wires in the vicinity of the connectors. Therefore, external noise is effectively prevented from being introduced into the communication signal lines through the connectors and nearby locations.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
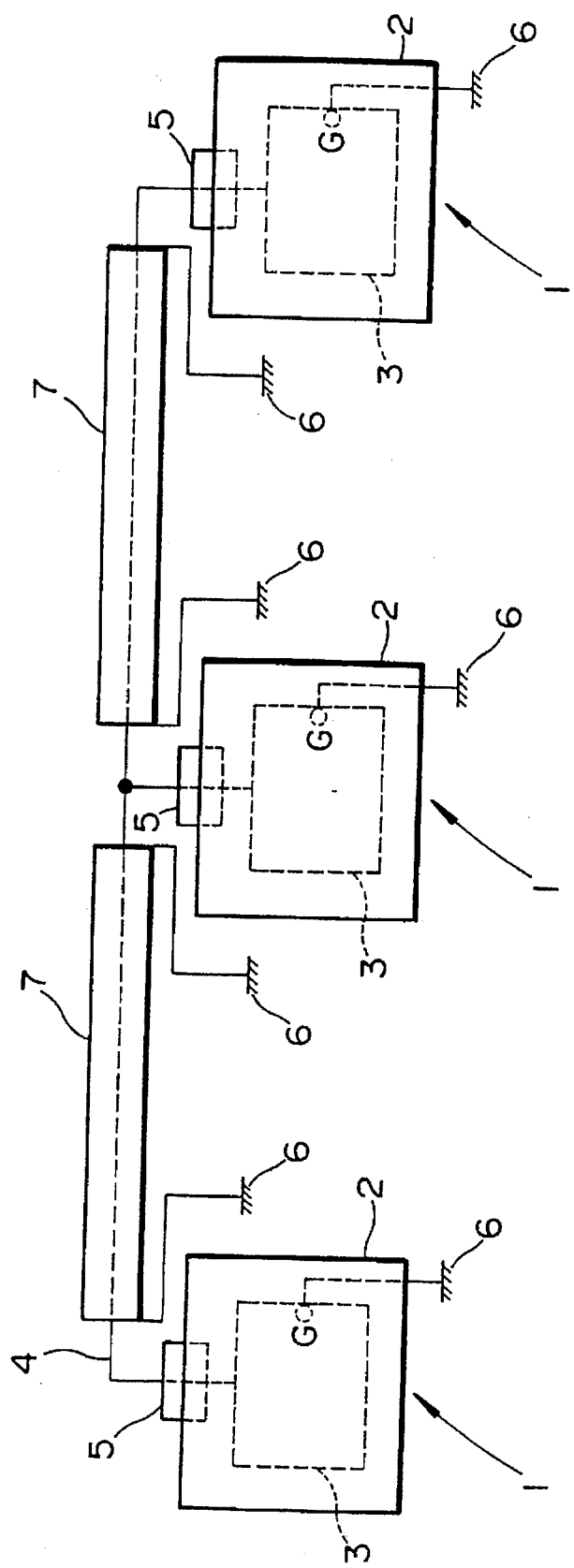
FIG. 1 is a schematic view of a wiring structure for an automobile multiplex communication system according to a first embodiment of the present invention.

As shown in FIG. 1, an automobile multiplex communication system which incorporates a wiring structure according to a first embodiment of the present invention has a plurality of, e.g., three, control units (ECUs) 1 mounted on an automobile body (not shown). Each of the ECUs 1 has a housing 2 which accommodates a circuit 3 including a microcomputer or the like. Communication signal lines 4 comprising twisted pairs are connected to the ECUs 1 through connectors 5 mounted on the respective housings 2 for multiplex communications between the ECUs 1. The circuits 3 of the ECUs 1 have respective ground terminals G that are grounded to a conductor 6 of the automobile body.

The communication signal lines 4 are covered with shield lines 7 which surround the communication signal lines 4 between the ECUs 1. The shield lines 7 are mounted on the communication signal lines 4 substantially the full length of the portions of the communication signal lines 4 which extend between the ECUs 1.

The shield lines 7 have respective ends positioned closely to the connectors 5 of the ECUs 1, but electrically separate from the connectors 5 and grounded to the conductor 6 of the automobile body.

In the automobile multiplex communication system with the above wiring structure, multiplex communications are carried out between the ECUs 1 through the communication signal lines 4. The shield lines 7 which cover most of the communication signal lines 4 are electrically separate from the connectors 5 by which the communication signal lines 4 are connected to the circuits 3 of the ECUs 1. The ends of the shield lines 7 which are positioned closely to the connectors 5 are directly grounded to the conductor 6 of the automobile body which is not susceptible to external noise. Therefore, even when external noise is applied to the shield lines 7, the external noise picked up by the shield lines 7 is reliably prevented from being introduced into the communication signal lines 4 through the connectors 5 that are positioned near the ends of the shield lines 7. Consequently, the automobile multiplex communication system is highly resistant to noise with respect to multiplex communications between the ECUs 1.

Figure 2:
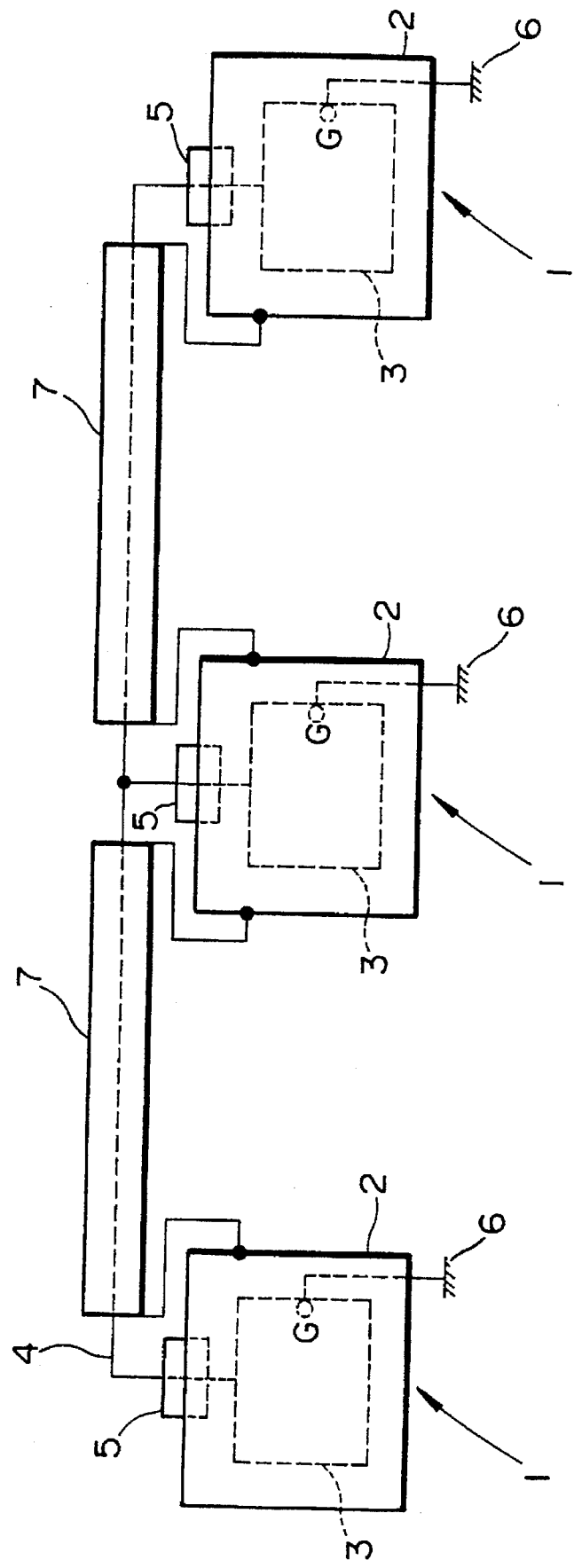
FIG. 2 is a schematic view of a wiring structure for an automobile multiplex communication system according to a second embodiment of the present invention.
Figure 3:
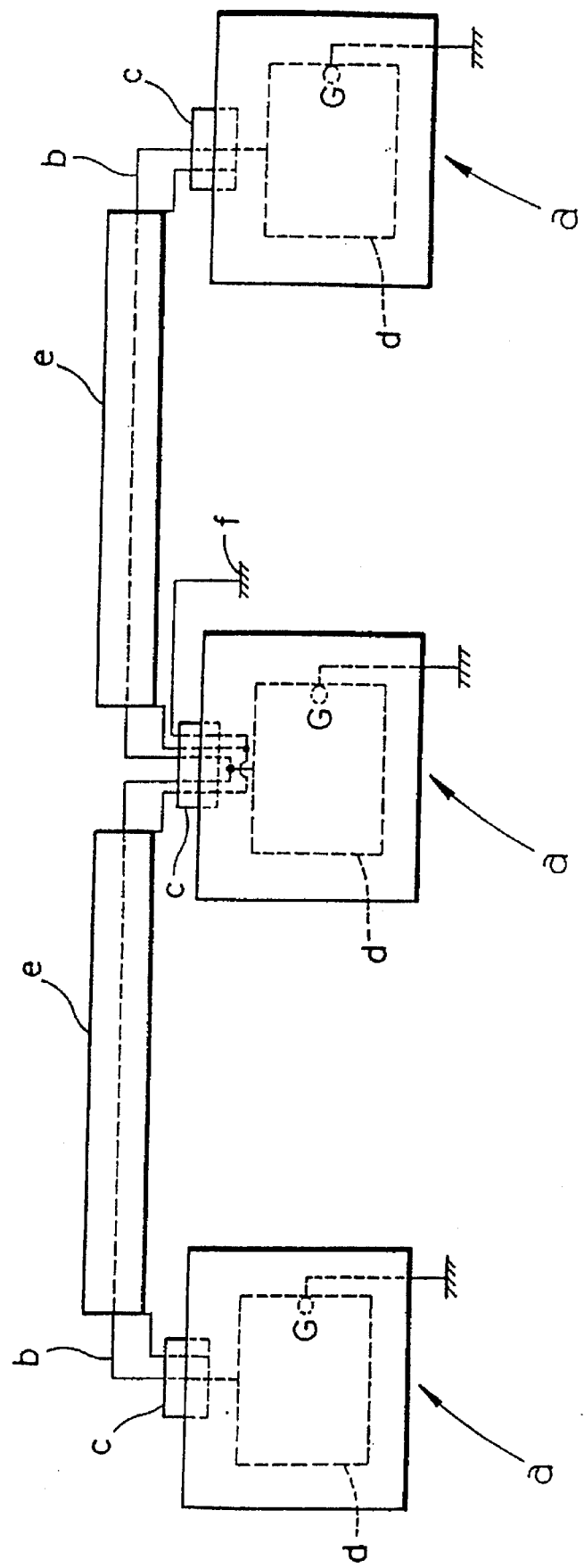
FIG. 3 is a schematic view of a conventional wiring structure for an automobile multiplex communication system.

FIG. 2 shows a wiring structure for an automobile multiplex communication system according to a second embodiment of the present invention.

The wiring structure according to the second embodiment shown in FIG. 2 differs from the wiring structure according to the first embodiment shown in FIG. 1 with respect to the grounding of shield wires. Those parts of the automobile multiplex communication system shown in FIG. 2 which are identical to those of the automobile multiplex communication system shown in FIG. 1 are denoted by identical reference numerals, and will not be described in detail below.

According to the second embodiment, the housings 2 of the respective ECUs 1 are made of a conductor material, and the ends of the shield wires 7 which cover the communication signal lines 4 are grounded to the housings 2 that are close to the ends of the shield wires 7.

In the automobile multiplex communication system shown in FIG. 2, the shield wires 7 are electrically separate from the connectors 5 by which the communication signal lines 4 are connected to the circuits 3 of the ECUs 1, and the ends of the shield wires 7 positioned closely to the connectors 5 are directly grounded to the housings 2 which are not susceptible to external noise. Accordingly, even when external noise is applied to the shield lines 7, the external noise picked up by the shield lines 7 is reliably prevented from being introduced into the communication signal lines 4 through the connectors 5 that are positioned near the ends of the shield lines 7. Consequently, the automobile multiplex communication system is highly resistant to noise with respect to multiplex communications between the ECUs 1.

In the second embodiment, the housings 2 may be grounded to the conductor 6 of the automobile body.

Although certain preferred embodiments of the present invention have been shown and described in detail, it should be understood that various changes and modifications may be made therein without departing from the scope of the appended claims.

What is claimed is:

1. A wiring structure for an automobile multiplex communication system, comprising:

a plurality of control units mounted on an automobile body, said control units having respective circuits and respective connectors connected thereto;

communication signal lines connected to said circuits through said respective connectors for multiplex communications between said control units; and shield means for covering said communication signal lines between said control units;

said shield means being electrical separate from said connectors and having respective ends positioned closely to the connector, said ends being grounded directly to a conductor of the automobile body which is outside of said control units.

* * * * *